United States Patent [19]
Jilek et al.

[11] Patent Number: 5,948,833
[45] Date of Patent: Sep. 7, 1999

[54] METHOD OF REDUCING YELLOWING OF WATER-BORNE ROAD MARKING PAINTS AND COMPOSITION USED THEREIN

[75] Inventors: Josef Hans Jilek, Vienna, Austria; Angelo Sanfilippo, Valbonne, France; Donald Craig Schall, Lansdale, Pa.; Andrew Paul Trapani, Valbonne, France

[73] Assignee: Rohm and Haas Company, Phila., Pa.

[21] Appl. No.: 08/858,278

[22] Filed: May 19, 1997

Related U.S. Application Data

[63] Continuation of application No. 08/651,836, Jun. 4, 1996, abandoned.

[51] Int. Cl.⁶ ...................................................... F21V 7/22
[52] U.S. Cl. ........................ 523/172; 524/123; 524/124; 524/126; 524/128; 524/133; 524/238; 524/414; 524/415; 524/416; 524/417
[58] Field of Search .............................. 523/172; 524/238, 524/123, 124, 126, 128, 133, 414, 415, 416, 417

[56] References Cited

U.S. PATENT DOCUMENTS

| | | | |
|---|---|---|---|
| 3,740,365 | 6/1973 | Schuler et al. | 260/22 |
| 4,325,856 | 4/1982 | Ishikawa et al. | 523/201 |
| 4,654,397 | 3/1987 | Meuller-Mall et al. | 524/460 |
| 4,814,209 | 3/1989 | Arnold | 427/409 |
| 4,814,373 | 3/1989 | Frankel et al. | 424/460 |
| 4,916,171 | 4/1990 | Brown et al. | 523/161 |
| 5,527,853 | 6/1996 | Landy et al. | 524/521 |

FOREIGN PATENT DOCUMENTS

| | | |
|---|---|---|
| 343831 | 5/1989 | European Pat. Off. . |
| 0482961 | 4/1992 | European Pat. Off. . |
| 482 961 A2 | 4/1992 | European Pat. Off. . |
| 1 082 051 | 9/1967 | United Kingdom . |

*Primary Examiner*—Edward J. Cain
*Attorney, Agent, or Firm*—Hsiang-ning Sun

[57] ABSTRACT

A water-borne road marking paint composition which includes a chelating agent capable of chelating iron ions to form a substantially colorless complex is provided. A road marking produced from the traffic paint of the present invention substantially reduces or prevents yellowing of white road marking from iron and iron compound debris strewn on the road surfaces. A method of reducing or preventing yellowing of a newly-applied road marking on a road surface of a water-borne road marking paint is also disclosed. The method comprises incorporating in the water-borne road marking paint a chelating agent capable of chelating iron ions to form a substantially colorless complex. Further reduction of yellowing of the road marking is observed when a pigment dispersant is incorporated in the water-borne road marking paint.

11 Claims, No Drawings

METHOD OF REDUCING YELLOWING OF WATER-BORNE ROAD MARKING PAINTS AND COMPOSITION USED THEREIN

This is a continuation of application Ser. No. 08/651,836, filed Jun. 4, 1996, now abandoned.

This invention is concerned with water-borne road marking paints (hereinafter sometimes referred to as "traffic paints"), and in particular the problem of yellowing which sometimes occurs after application of the paint on the road.

Much research has been devoted to ensuring that white water-borne traffic paints remain white and stain free for as long as possible after application. However, it has been observed that portions of clean white surfaces of newly applied traffic paint can turn to a dirty yellow or brown color, sometimes along long stretches of traffic markings on the road. Such a staining phenomenon is known as "yellowing". Although the visibility of the paint is normally not seriously affected, the yellowing is undesirable for aesthetic reasons, and particularly because users of the traffic paint may believe that a paint which turns yellow within days of application is of poor quality.

Until now there has been no explanation for this phenomenon, which is noted for the apparent randomness of its appearance, and the fact that it occurs soon after application or not at all. An identical paint applied on the same stretch of road on two occasions may turn yellow at one time, and not the next. As a result of this lack of understanding of the problem, a solution has so far not been found.

We have now established a possible cause for this phenomenon, and as a result have been able to unexpectedly develop a solution. We believe that the yellowing is caused by iron reacting with materials in the paint formulation to produce what is essentially rust inside the paint, thereby causing yellowing. There is no obvious source of iron in the vicinity of an applied traffic paint. It is believed that it may come from vehicles or even from some components of the road surfaces, such as, asphalt, on which the paint has been applied. The iron may be able to penetrate the paint if there is high humidity or rain in the first 24 to 48 hours after application, when the paint is not fully dry and hence is still susceptible to water penetration. Having been introduced into the paint layer in this way, water then is believed to react with certain components of the paint to form a yellow or brown "rust", which stains the paint and causes yellowing. However, if the rain is particularly heavy, the iron and "rust" may be washed out, thereby removing the yellow color. This would, without reliance thereon, explain the apparent randomness of the phenomenon.

EP-A-34383 I discloses a top coat paint for protecting a surface from external rust staining, i.e., rust from an external source that drips or falls onto the surface. The paint contains a chelating agent capable of reacting with iron ions in rust to form a colorless complex. GB 2172599A discloses a similar paint, which contains as chelating agent, which is a polyphosphonate salt pigment. Neither of these references, nor any of the other prior disclosures of such anti-rust staining paints, mention such a problem with traffic paints. Indeed, there is nothing in the prior art to explain the aforedescribed yellowing problem, or to suggest that it is in any way connected with rust staining.

The present invention provides for a water-borne road marking paint comprising a chelating agent capable of chelating iron ions to form a substantially colorless complex. A further aspect of the invention is a method of reducing or preventing yellowing of a newly-applied road marking on a road surface of a water-borne road marking paint, said method comprising incorporating in said water-borne road marking paint a chelating agent capable of chelating iron ions to form a substantially colorless complex.

As used herein:

"GPC weight average molecular weight" means the weight average molecular weight determined by gel permeation chromatography (GPC) which is described on page 4, Chapter I of The Characterization of Polymers published by Rohm and Haas Company, Philadelphia, Pa. in 1976, utilizing polymethyl methacrylate as the standard. The GPC weight average molecular weight can be estimated by calculating a theory weight average molecular weight. In systems containing chain transfer agents, the theory weight average molecular weight is simply the total weight of polymerizable monomer in grams divided by the total molar amount of chain transfer agent used during the polymerization. Estimating the molecular weight of an emulsion polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, we have used a factor of approximately 0.5). Further information on theoretical molecular weight calculations can be found in *Principles of Polymerization* 2nd edition, by George Odian published by John Wiley and Sons, N.Y., N.Y. in 1981 and in *Emulsion Polymerization* edited by Irja Pirma published by Academic Press, N.Y., N.Y. in 1982.

"Dispersed polymer" means particles of polymer colloidally dispersed and stabilized in an aqueous medium.

"Solubilized polymer" means a water soluble polymer dissolved in an aqueous medium. Solubilized polymer results in a polymer solution characterized by having the self-crowding constant (K) of the Mooney equation $[1/\text{In}_{\eta_{rel}} = 1/BC\text{-}K/2.5]$ equal to zero. By contrast, dispersed polymer has (K) equal to 1.9. The details of Mooney equation are disclosed in an article entitled "*Physical Characterization of Water Dispersed and Soluble Acrylic Polymers*" by Brendley et al., in "Nonpolluting Coatings and Coating Processes" published by Plenum Press, 1973 and edited by Gordon and Prane.

"Polymer solids" means polymer in its dry state.

The term "(meth)acrylate" includes acrylate and methacrylate.

"Chelating agent" means a compound which interacts with a metal, such as, iron, through more than one coordinating atom.

"Pigment dispersant" means a material used for improving the dispersion of pigment particles in a paint composition. The pigment dispersant is believed to adsorb on the surface of pigment particles in a paint composition to increase the negative charge thereon. As a result, it is believed that the columbic repulsion between pigment particles is increased and the dispersion of pigment particles in the paint composition is thereby improved.

The water-borne road marking paint of the present invention includes one or more a dispersed or a solubilized polymers in an aqueous medium Such polymers are well known in the art.

Preferably, the dispersed or solubilized polymer is emulsion polymerized in an aqueous medium by copolymerizing at least one of the following monomers, some of which are alkyl (ninth)acrylate monomers, such as, $(C_1\text{–}C_{20})$alkyl (meth)acrylate monomers. As used herein, the terminology "$(C_1\text{–}C_{20})$alkyl" denotes an alkyl substituent group having from 1 to 20 carbon atoms per group. Suitable $(C_1-C_{20})$alkyl (meth)acrylate monomers include, for example, acrylic and methacrylic ester monomers including methyl (meth) acrylate, ethyl (meth)acrylate, butyl (meth)acrylate, 2-ethylhexyl (meth)acrylate, decyl (meth)acrylate, lauryl (meth)acrylate, cetyl (meth)acrylate, eicosyl (meth)acrylate, isobornyl (meth)acrylate, isodecyl (meth)acrylate, oleyl (meth)acrylate, palmityl (meth)acrylate, stearyl (meth) acrylate, vinyl ester monomers including, for example, vinyl acetate, vinyl propionate, vinyl neononanoate, vinyl neodecanoate, vinyl- 2-ethylhexanoate, vinyl pivalate, vinyl versatate or a mixture thereof. Suitable vinyl monomers include, for example, vinyl halide, preferably vinyl chloride, vinylidene halide, preferably vinylidene chloride, or various mixtures thereof. Suitable vinyl aromatic monomers include, for example, one or more polymerizable vinyl aromatic compounds and mixtures thereof and also include styrene, alkyl-substituted styrenes, such as, α-methylstyrene, α-ethylstyrene, p-methylstyrene and vinyl xylene, halogenated styrenes, such as, chlorostyrene, bromostyrene and dichlorostyrene, other styrenes having one or more nonreactive substituents on the benzene nucleus, vinyl naphthalene or various mixtures thereof. Suitable neutral monomers include, for example, one or more monomers, such as, acrylonitrile, acrylamide, alkyl substituted acrylamide monomers, hydroxy alkyl (meth)acrylate monomers, such as, aceto acetoxyethyl (meth)acrylate, hydroxyethyl (meth)acrylate, and hydroxypropyl (meth)acrylate and isomers of hydroxy butyl (meth)acrylate or various mixtures thereof.

If desired, the dispersed or solubilized polymer further includes in the range of from 0.5 percent to 20.0 percent, preferably in the range of from 5 percent to 15 percent, of a monomer containing an acid functionality, all percentages being in weight percent based on the total weight of polymer solids.

The acid functionality results from including in the monomer mixture one or more of the monoethylenically unsaturated carboxylic acid monomers, such as, for example, acrylic acid, methacrylic acid, itaconic acid, crotonoic acid, aconitic acid, atropic acid, maleic acid, maleic anhydride, fumaric acid, vinyl benzoic acid, half-esters of ethylenically unsaturated dicarboxylic acids, half-amides of ethylenically unsaturated dicarboxylic acids and various mixtures thereof. Other suitable monomer include one or more monomethyl itaconate, monomethyl fumarate, monobutyl fumarate, acrylamido propane sulfonate, sodium vinyl sulfonate, 2 acrylamido-2-methylpropanesulfonic acid, 2-methacryloxyethyl phosphate (MOP) and phosphoethyl(meth)acrylate. The monomer containing the monoethylenically unsaturated carboxylic acid are preferred and acrylic acid, methacrylic acid and mixtures thereof are more preferred.

Preferably, the traffic paint further includes a polyfunctional amine, polymerized from one or more monomers, such as, dimethylaminopropylmethacrylamide, oxazolidinoethylmethacrylate and dimethylaminoethylmethacrylate. Such a composition is disclosed in a commonly assigned U.S. patent application filed on Nov. 14, 1994, entitled "SHELF STABLE FAST-CURE AQUEOUS COATING" having a Ser. No. 08/340,461, which has been abandoned. If desired, an amine modified dispersed or solubilized polymer, or a blend of the amine modified dispersed or solubilized polymer with a polyfunctional amine or a combination thereof, preferably in equal proportions, of the blend and the amine modified latex binder. The blend includes from 0 to 20 percent, preferably 0.5 to 10, and more preferably 2 to 5 percent, of the polyfunctional amine, all in weight percentages based on the total weight of blend solids.

The polymerization process is typically initiated by conventional free radical initiators, such as, for example, hydrogen peroxide, t-butyl hydroperoxide, ammonium and alkali persulfates, typically at a level of 0.05 percent to 3.0 percent by weight, all weight percentages based on the weight of total monomer. Redox systems using the same initiators coupled with a suitable reductant such as, for example, sodium bisulfite, sodium hydrosulfite and isoscorbic acid, may be used at similar levels.

Chain transfer agents may be used in an amount effective to provide the desired GPC weight average molecular weight. For the purposes of regulating molecular weight of the polymer being formed, suitable chain transfer agents include well known halo-organic compounds, such as, carbon tetrabromide and dibromodichloromethane; sulfur-containing compounds, such as, alkylthiols including ethanethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctylmercapto propionate; bromoform; bromotrichloromethane; carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof. Mercaptans are preferred.

When a dispersion of polymer particles is utilized, the polymer particle size is controlled by the amount of conventional surfactants added during the emulsion polymerization process. Conventional surfactants include anionic, nonionic emulsifiers or their combination. Typical anionic emulsifiers include the salts of fatty rosin and naphthenic acids, condensation products of naphthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyvinyl alcohols, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1 to 6 percent by weight based on total weight of total monomer.

If desired the dispersed polymer may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases, the majority of the surface area of the particle will be occupied by at least one outer phase and the interior of the polymer particle will be occupied by at least one inner phase. The outer phase of the multi-stage polymer particles weighs 5 weight percent to 95 weight percent based on the total weight of the particle. It is often desirable for each stage of the multi-stage polymer particles to have a different Tg. If desired, each stage of these multi-stage polymer particles may be provided with different GPC number average molecular weight, such as, the multi-stage polymer particle composition disclosed in U.S. Pat. No. 4,916,171.

The multi-stage polymer particles of the dispersed polymer are prepared by conventional emulsion polymerization process in which at least two stages differing in composition are formed in a sequential fashion. Such a process usually results in the formation of at least two polymer compositions. Each of the stages of the multi-stage polymer particles may contain the same chain transfer agents, surfactants, as those disclosed earlier. The emulsion polymerization techniques used for preparing such multi-stage polymer particles are well known in the art and are disclosed, for example, in the U.S. Pat. Nos. 4,325,856, 4,654,397, 4,814,373 and 4,916,171.

The applicants have unexpectedly discovered that the incorporation of a chelating agent in a waterborne traffic paint substantially reduces or prevents the iron, scattered on road surfaces, from reacting with paint surface to form the "rust" compounds that cause the yellowing effect. As a result, the applied traffic paint surface remains substantially white under varied traffic conditions. Tests which the applicants have conducted using a solution of ferrous sulfate to mimic the effect of the iron confirm the efficacy of this approach. The traffic paint includes in the range of from 0.1 percent to 5 percent, preferably in the range of from 1 percent to 3 percent of the chelating agent, all percentages being in weight percentages based on the total weight of polymer solids.

Some of the chelating agents suitable for use in the present invention include aminocarboxylic acids, such as, ethylenediamine tetraacetic acid, nitrilotriacetic acid, diethylenetriamine pentaacetic acid, hydroxyethylethylenediaminetriacetic acid, diethanolglycine, ethanoldiglycine, ethylenediamine disuccinic acid, iminodiacetic acid and ammonium and alkali metal salts thereof; phosphoniocarboxylic acids, such as, 2-phosphonobutane-1,2,4-tricarboxylic acid and ammonium and alkali metal salts thereof; phosphonic and aminophosphonic acid and ammonium and alkali metal salts thereof, such as, 1-hydroxyethylidene-1,1-diphosphonic acid, aminotri (methylenephosphonic acid), diethylenetriamine penta (methylene phosponic acid), hexamethylene diamine tetra (methylene phosphonic acid); tripolyphosphoric acid and ammonium and alkali metal salts thereof; pyrophosphoric acid and ammonium and alkali metal salts thereof; hexametaphosphoric acid and ammonium and alkali metal salts thereof; organic acids, such as, fumaric acid, citric acid, oxalic acid, itaconic acid, crotonic acid, maleic acid, and ammonium and alkali metal salts thereof; diketone derivatives, such as, $Zn^{2+}$ salt of 2,4-pentandione; hydroxamic acid; glass capable of releasing phosphate ions and polyphosphonate salt of a pigment, such as, those disclosed in EP 0 343 831 A1; and various combinations of the foregoing chelating agents.

The preferred chelating agents include ammonium and alkali metal phosphonates or phosphonic acid (a compound bearing one or more $PO(OH)_2$ groups) and ethylenediamine tetraacetic acid. Particularly preferred is amino-tris-methylene phosphonic acid, sold under the trade name DEQUEST® 2000 by Monsanto Chemical Company, Saint Louis, Mo.

The traffic paint of the present invention further includes a conventional white pigment, preferably, titanium dioxide, at concentrations in the range of 5 to 20 percent, preferably 6 to 16 percent, all by weight percent based on the total weight of the composition. Some of the white pigments suitable for use in the present traffic paint include those supplied by E. I. du Pont and Company, Incorporated, Wilmington, Del. under the trade name as TiPure® titanium dioxide white pigment. Another supplier of titanium dioxide white pigment, under the trade name as TITAN™ TR 92 Titanium dioxide, is Tioxide, Cleveland, United Kingdom.

If desired the traffic paint may include 0.25 percent to 2 percent of a pigment dispersant in combination with 0.25 percent to 3 percent of the chelating agent to further prevent or reduce the yellowing of the traffic paint marking, all percentages being in weight percentages based on the total weight of polymer solids. Some of the suitable pigment dispersants include polymeric carboxylic acids, and ammonium and alkali metal salts thereof. Some of the suitable polymeric carboxylic acids include polyacrylic acid, polymethacrylic acid, copolymers of (meth)acrylic acid and maleic acid, all typically having a weight average molecular weight in the range of from 4000 to 10,000. Some of the other suitable pigment surfactants include copolymers of meth(acrylic) acid and polar compounds, such as, hydroxyethyl methacrylate, and non-polar compounds, such as, butyl methacrylate; and reaction products of maleic anhydride and diisobutylene. Polymethacrylic acid and ammonium and alkali metal salts thereof are preferred.

The waterborne traffic paints of the present invention typically include fillers, such as, calcium carbonates, talcs, silicas, and sometimes solid glass beads; coalescing and anti-freeze solvents. If desired, the waterborne traffic paints of the present invention includes additives, such as, surfactants, biocides and thickeners.

The present invention is also directed to a method of reducing or preventing yellowing of a newly-applied road marking on a road surface of a water-borne road marking paint. The method includes incorporating in the water-borne road marking paint the chelating agent capable of chelating iron ions to form a substantially colorless complex. The method further comprises incorporating in said water-borne road marking paint, a pigment dispersant for further reducing or preventing yellowing of said newly-applied road marking. The method of present invention contemplates incorporating the chelating agent in the traffic paint or after a road marking of the traffic paint has been applied on the road surface by conventional applying means, such as, mobile spraying devices. Thereafter, the chelating agent may be conventionally applied, such as, by spraying, on top of the road marking, while the road marking is still in a wet state. If desired glass beads may be applied on top of the road marking, while the traffic paint is still wet, to produce reflective road markings having enhanced visibility. It is further contemplated that the reflective glass beads may be mixed with the chelating agent before the mixture of thereof, is applied on top of the wet road marking.

EXAMPLES

The Examples 1 through 5 of the present invention were based on the following formulations:

TABLE 1

| Component | Example 1 & 4 Weight (g/liter) | Example 3 Weight (g/liter) | Examples 2 & 5 Weight (g/liter) |
|---|---|---|---|
| Binder[1] | 487.0 | 487.0 | 487.0 |
| Pigment dispersant[2] | 8.4 | 0.0 | 8.4 |
| Chelating agent[3] | 0.0 | 24.3 | 24.3 |
| Non-silicone defoamer[4] | 4.0 | 4.0 | 4.0 |
| Water | 69.0 | 53.1 | 44.7 |
| Titanium dioxide pigment[5] | 265.0 | 265.0 | 265.0 |

TABLE 1-continued

| Component | Example 1 & 4 Weight (g/liter) | Example 3 Weight (g/liter) | Examples 2 & 5 Weight (g/liter) |
|---|---|---|---|
| Ca carbonate 5 microns[6] | 394.0 | 394.0 | 394.0 |
| Ca carbonate 10 microns[7] | 394.0 | 394.0 | 394.0 |

The above components were mixed for 20 minutes until smooth, and then the following components were added to complete the preparation of Examples 1 through 5:

TABLE 2

| Component | Examples 1-5 Weight (g/liter) |
|---|---|
| Freeze-thaw stabilizer[8] | 26.0 |
| Coalescent[9] | 23.0 |
| Water | 10.0 |
| Base[10] | 0.2 |
| Non-silicone defoamer[4] | 1.0 |
| Water | 25.0 |
| Total | 1706.6 |

The components described in Tables 1 and 2 above are listed below:

1 is a PRIMAL® E-2706 (50%) polymer emulsion supplied by Rohm and Haas Company, Philadelphia, Pa.

2 is a OROTAN® 901 (30%) is a pigment dispersant supplied by Rohm and Haas Company, Philadelphia, Pa.

3 is a chelating agent formulated by mixing 45 grams of water with 15 grams of a 28% ammonia solution, and then adding 40 grams DEQUEST® 2000 (at 50% strength), to give a pH of 9.5. The ammonia was not added last as this fails to give adequate neutralization.

4 is a DREW™ TG 4250 non-silicone defoamer supplied by Drew Ameroid Nederland B.V., Triathlonistrasse 33, 3078 HX Rotterdam, The Netherlands.

5 is a TITAN™ TR 92 Titanium dioxide white pigment supplied by Tioxide, West Site, Haverton Hill Road, Billingham, Cleveland TS23 1PS, United Kingdom.

6 is a DURCAL™ 5 filler supplied by Omya, Pluess-Stauffer AG, CH-4665 Offringen, Switzerland.

7 is a DURCAL™ 10 filler supplied by Omya, Pluess-Stauffer AG, CH-4665 Offringen, Switzerland.

8 is Ethanol.

9 is a TEXANOL® Coalescent supplied by Eastman Chemical Co., Kingsport, Tenn.

10 is ammonia used to adjust the pH of the formulation to 9 5.

Examples 1 through 5 were equilibrated for 1 day.

A coating from Examples 1 through 3 having a thickness of 380 micrometers were applied to a glass surface, and left to dry for one hour, at which point, 10 drops of $FeSO_4$ solution (3 g $FeSO_4 \cdot 7H_2O$, 1997 g water, 6 drops 25% sulfuric acid) were applied to the coating surface to mimic the effect of yellowing by iron on traffic markings. The coatings were then visually examined after drying for yellowing. The results are described in Table 3 below:

TABLE 3

| Example | Chelating Agent | Pigment Dispersant | Yellowing after 2 hrs | Yellowing after 16 hrs |
|---|---|---|---|---|
| 1 | Not present | Present | Yellow | Yellow |
| 2 | Present | Present | White | White |
| 3 | Present | Not present | Off-white | Off-white |

It can seen from Table 3 that when a composition (Example 3) containing a chelating agent is utilized in a traffic paint, no significant yellowing was observed when it to compared to a composition (Example 1), which did not contain the chelating agent. However, when the composition contained, not only the chelating agent but also a pigment dispersant (Example 2), even further improvement in reducing yellowing of the coating was observed when compared to Example 3.

The road markings, also known as, test tracks, were prepared and applied in accordance with ASTM D 713-90. The road markings from Examples 4 and 5 having a thickness in the wet state of 450 micrometers were spray applied transversely to the direction of traffic flow, i.e., perpendicular to the flow of traffic, over a bituminous asphalt road by means of a walk behind, self-propelled striping machine Model No. LT 20, supplied by CMC, Como, Italy. The reason for applying the test tracks in a direction transverse to the traffic flow was to accelerate the degradation of test tracks by increasing the number of vehicle passes over the test tracks, particularly where the vehicle tires pass most frequently, which is defined as "wheel track area". The yellowing of the test tracks was observed 106 days after their application to the road surface with a portable tristimulus calorimeter supplied by Minolta Camera Company Limited, Japan. Color difference measurement is described in ASTM E-1347 "Color and Color-Difference Measurement by Tristimulus (Filter) Colorimetry". The b* value is described in ASTM E-284 "Standard Terminology of Appearance" under CIELAB color difference. The color difference was calculated by using the CIE 1976 L*a*b* opponent color scales where the b* scale is positive in the yellow direction and negative in the blue direction. b* opponent color scales are also described in "Principles of Color Technology, 2nd Edition", Fred W Billmeyer, Jr., John Wiley & Sons, 1981. The "b* value" is a measure of the degree of yellowing observed. Higher the b* value, yellower will be the appearance of the traffic markings applied over the road surface. A b* value of 3 represents a freshly painted white surface. A b* value of 8 or less represents an acceptable degree of yellowing of the traffic marking. Table 4 represents the b* values of the road markings prepared from Examples 4 and 5.

TABLE 4

| Example | b* value |
|---|---|
| 4 | 9.4 |
| 5 | 6.4 |

From Table 4 above, it is seen that a road marking from a traffic paint composition (Example 5) containing a chelating agent provides an acceptable degree of yellowing results after a prolonged exposure to traffic conditions when it is compared to a road marking from a traffic paint composition (Example 4) which did not contain the chelating agent.

We claim:

1. A water-borne road marking paint comprising a binder having a total weight and a chelating agent capable of chelating iron ions to form a substantially colorless complex, said chelating agent comprising a material selected from the group consisting of aminocarboxylic acid, ammonium or alkali metal salts thereof; phosphonocarboxylic acid, ammonium or alkali metal salts thereof; phosphonic acid, ammonium or alkali metal salts thereof; aminophosphonic acid, ammonium or alkali metal salts thereof; tripolyphosphoric acid, ammonium or alkali metal salts thereof, pyrophosphoric acid, ammonium or alkali metal salts thereof; hexametaphosphoric acid, ammonium or alkali metal salts thereof; organic acid, ammonium and alkali metal salts thereof; diketone derivative of 2,4-pentandione; hydroxamic acid; and combinations thereof.

2. The road marking paint according to claim 1, wherein the aminophosphonic acid is selected from the group consisting of aminotri(methylenephosphonic acid), diethylenetriamine penta(methylene phosphonic acid) and hexamethylene diamine tetra(methylene phosphonic acid).

3. The road marking paint according to claim 1, wherein the chelating agent capable of chelating iron ions is aminotris-methylene phosphonic acid, ammonium or alkali metal salts thereof.

4. The road marking paint according to claim 1 wherein said paint comprises 0.1 to 5 percent by weight based on the total weight of polymer solids of said chelating agent.

5. The road marking paint according to claim 1 further comprising a pigment dispersant.

6. The road marking paint according to claim 1 further comprising a white pigment.

7. The road marking paint according to claim 1 wherein the chelating agent capable of chelating iron ions comprises a compound bearing one $PO(OH)_2$ group or EDTA.

8. The road marking paint according to claim 1, wherein said organic acid is selected from the group consisting of fumaric acid, citric acid, oxalic acid, itaconic acid, crotonic acid and maleic acid.

9. The road marking paint according to claim 1 further comprising a substance selected from the group consisting of a polyfunctional amine, an amine modified, dispersed or solubilized polymer, and a combination thereof.

10. The road marking paint according to claim 9, wherein said polyfunctional amine is polymerized from a monomer selected from the group consisting of dimethylaminopropylmethacrylamide, oxazolidinoethylmethacrylate, dimethylaminoethylmethacrylate and a combination thereof.

11. The road marking paint according to claim 1, wherein the phosphonic acid comprises 1-hydroxyethylidene-1,1-diphosphonic acid.

* * * * *